3,473,118
PARTICLE MEASURING APPARATUS INCLUDING CONSTANT TEMPERATURE ELECTROSTATIC PRECIPITATOR AND RESISTANCE MEASURING CHAMBERS
Owen James Tassicker, Mangerton, Wollongong, New South Wales, Kenneth James McLean, Mount Pleasant, Wollongong, New South Wales, and Zlatko Herceg, Mangerton, Wollongong, New South Wales, Australia, assignors to Unisearch Limited, Kensington, New South Wales, Australia, a corporation of New South Wales
Filed Jan. 23, 1968, Ser. No. 699,920
Claims priority, application Australia, Jan. 23, 1967, 16,769/67
Int. Cl. G01r 27/02; B03c 3/76; G01n 31/00
U.S. Cl. 324—65          6 Claims

ABSTRACT OF THE DISCLOSURE

An apparatus for measuring the properties of gases and solid particles, having a precipitating chamber through which a sample of gas to be tested may be caused to pass, the chamber containing an electrostatic precipitator for connection to a high-voltage source, there being arranged immediately below the precipitating chamber a measuring chamber into which any particles precipitated by electrostatic action in the precipitating chamber can be caused to fall directly by rapping the apparatus, electrodes being provided in the precipitating chamber for use in a known manner to measure physical properties of the particles collected, the whole apparatus being maintained accurately at a pre-determined temperature by means of electrical heating elements and thermo sensitive control devices.

---

Figure 1:
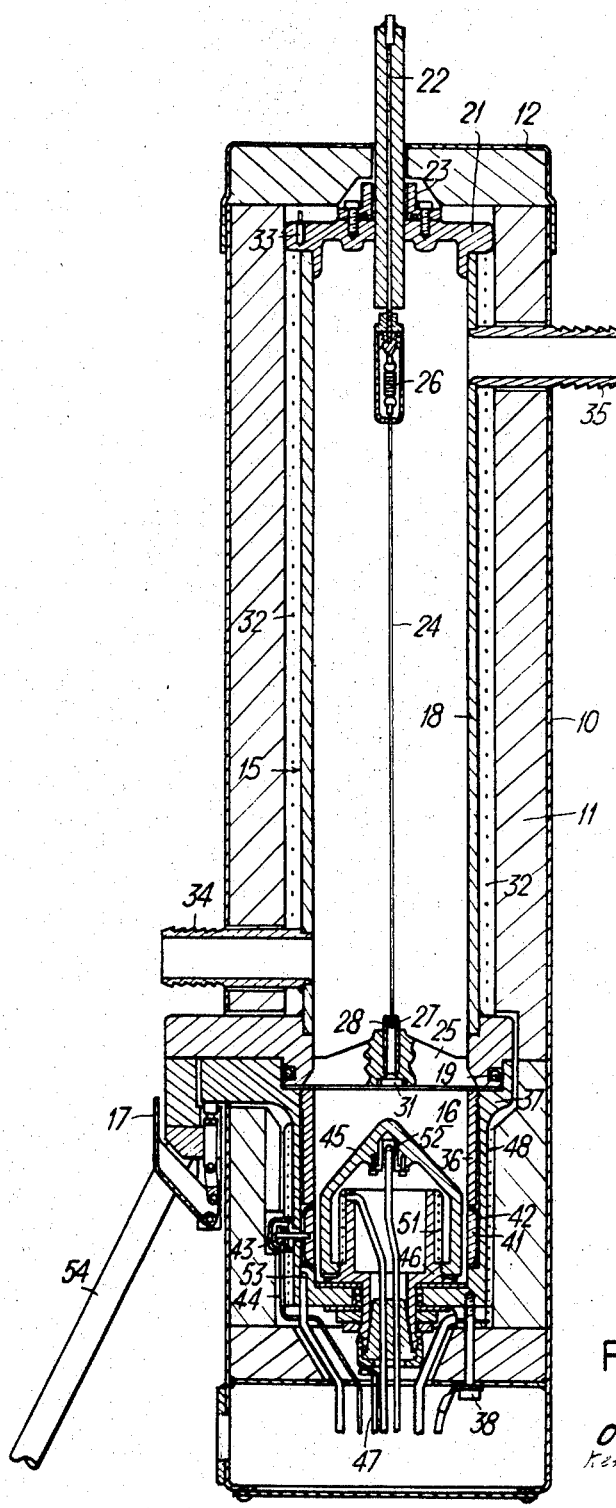

This invention relates to apparatus for the measurement of several electrical properties of particles of solid matter, and of gases which may or may not carry such particles in suspension. Particles carried by gases are commonly known as dispersoids. In the art of electrostatic precipitation, the properties of both the dispersoid and the gas in which the dispersoid is carried, are very important. Electrostatic precipitators are devices widely used to remove solid particles from flue gases which are emitted, for example, from the boilers of power generating stations or which are contained in the gaseous effluent from chemical plants.

The present invention provides an improved apparatus particularly although not exclusively suited for measuring those electrical properties of dispersoids and gases which are of great importance in the theory, design and operation of electrostatic precipitators.

A particular application of the invention is in the collection of suspended particles from the flue gas of, for example, the boiler of a generating station and the measurement of their resistivity and other characteristics.

Resistivity measurements of such particles have in the past been made in a variety of ways, but it has come to be recognized that such measurements have little or no validity unless the particles are maintained in the flue gas environment during the whole collecting and measuring procedure and under very close temperature control. A further important factor is to ensure that the resistivity of the whole population of particles is measured which requires that the apparatus used should be such as to collect as far as possible all the particles in the gas.

The present invention provides an apparatus which meets all these requirements in a higher degree than other apparatus at present available, which fall short in one or more of these respects. It provides furthermore apparatus which is also capable of more general application in the field of measurement of the electrical properties of gases and particles of matter.

The invention consists in apparatus for measuring the properties of gases and solid particles, the apparatus consisting of an enclosure having within it a precipitating chamber, there being a gas inlet to the precipitating chamber and a gas outlet from the precipitating chamber, electrostatic precipitator means within the precipitating chamber including a surface on which particles of matter suspended in a gas in the precipitating chamber can be precipitated, a measuring chamber arranged so that particles collected on said surface may be transferred directly from the said surface to the measuring chamber by rapping the apparatus, measuring electrodes in the measuring chamber defining between them a particle receiving zone, electrical heating means being provided in association with said enclosure for heating said enclosure, thermo-sensitive means associated with said electrical heating means whereby the interior of said enclosure may be maintained at a predetermined temperature and means whereby electrical connection may be made to said electrostatic precipitator means, to said electrodes and to said electrical heating and thermo-sensitive means.

Figure 2:
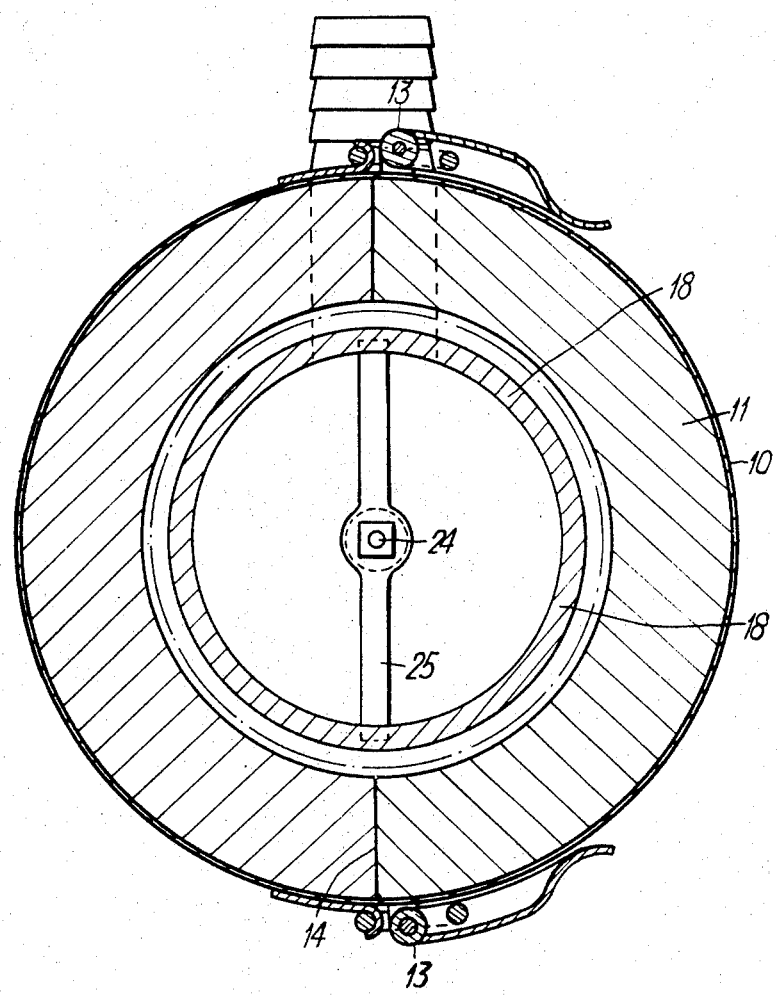

In order that the invention may be better understood and put into practice a preferred form thereof is hereinafter described by way of example only with reference to the accompanying drawings in which:

FIG. 1 is a longitudinal sectional view of the apparatus, in the median plane, and FIG. 2 is a sectional plan view on line 2—2 of FIG. 1.

The apparatus consists in an enclosure in the form of a cylindrical outer sheet metal casing 10 enclosing a layer of thermal insulating material 11 which may be for example fibre glass. The upper end of the casing is closed by a removable cap 12 of similar construction. After removal of the cap 12 the casing 10 together with the insulating layer may be removed by undoing the quick release clamps 13 shown in FIG. 2 (these have been omitted from FIG. 1 for the sake of clarity) as the casing is split on the line 14 of FIG. 2.

The apparatus proper is in two parts, an upper precipitating chamber indicated generally at 15 and a lower measuring chamber indicated generally at 16, these chambers being flanged at their lower and upper ends respectively and being connected by means of a bayonet joint which is locked by the quick release clamp 17. The arrangement is such that after release of the clamp 17 relative partial rotation of the chambers enables them to be separated. An O-ring 19 ensures a gas tight seal between the chambers when connected. It will be appreciated that the form of connection used between the chambers is largely a matter of convenience and any other suitable form of connection that allows easy separation of the chambers for emptying and cleaning the apparatus may be used.

The precipitation chamber consists of a cylindrical wall 18 made preferably from a light alloy the interior surface of which is accurately and smoothly finished to a predetermined diameter and hard chrome plated. The choice of a light alloy is to reduce the weight of the apparatus as far as possible to make it easily portable and thus convenient to use in the field. Other materials used are also chosen for lightness where operating requirements permit.

The precipitating chamber is closed at its upper end by a plate 21 welded to the wall 18 and through the centre of this passes a high tension insulated electrode 22 which is supported in the bush 23. The electrode 22 is connected at its lower end to the discharge electrode which consists of a length of stainless steel wire 24 which is placed centrally within the cylindrical wall 18. The wire 24 extends between the insulator bar 25 at its lower end and the spring 26 at its upper end, which maintains the wire in tension. The lower end of the wire is formed with a bead 27 which lies within the cap 28 into which the screw 31 is threaded. Initial tension may be applied to the wire 24 by means of the screw 31.

The cylindrical wall 18 is surrounded by an electrical heating element 32, which enables the precipitation chamber to be maintained at a predetermined temperature by means of the thermocouple 33. This may be placed in the central portion of the cylindrical wall 18 instead of at one end as shown or a number of thermocouples may be used.

A gas inlet 34 is provided at the lower end of the precipitation chamber and a gas outlet 35 at the upper end so that flue gas may be caused to pass through the precipitation chamber directly from a flue.

The measuring chamber 16 is arranged immediately below the precipitation chamber 15 and is provided with an accurately cylindrical internal wall 36 concentric with that of the precipitation chamber. The wall 36 is screwed into the main body 37 of the measuring chamber and both are connected to earth through the terminal 38. An annular electrode 41 surrounded by an electrical insulating layer 42 is provided at the lower end of the wall 36 and an electrical connection to this electrode is provided through the terminal 43 and the screened lead 44.

Within the measuring chamber a central electrode 45 is arranged and this is hollow and externally concentric with the annular electrode 41. The upper end of the electrode 45 is conical to ensure that particles falling on it may be caused to fall into the particle receiving zone between the electrodes 41 and 45 when the apparatus is rapped.

The electrode 45 is mounted in the bottom of the measuring chamber by means of the bush 46 to which it is screwed. Both are electrically insulated from the measuring chamber by mica washers and O rings and electrical connection is made to the electrode 45 through the shielded lead 47.

Electrical heaters 48 and 51 are arranged around the measuring chamber and within the electrode 45 respectively and these are controlled by the thermocouples 52 and 53. All the leads shown emerging from the bottom of the measuring chamber are carried out of the base of the apparatus in a single screened cable (not shown) and through it connected to the necessary measuring and control apparatus. These are neither shown nor described as they are conventional and used in a known manner to make the measurements made possible by the construction of the apparatus.

The apparatus is supported on a light stand 54 made of light alloy tubing so that it may be readily set up at a suitable point in relation to the plant on which tests are to be carried out.

In use the gas inlet 34 is connected to a gas probe inserted in the gas stream to be tested and the gas outlet 35 is returned to the gas stream at some convenient point.

While the primary purpose of the apparatus is to remove from the gas stream any dispersoids carried in the gas and collect them in the particles receiving zone in such a manner that their electrical characteristics, particularly resistivity, may be measured under controlled conditions, as described below, the apparatus also enables measurements to be made in respect of the gas itself.

The precipitating chamber is essentially an electrostatic precipitator the geometry of which is such as to facilitate the interpretation of measurements made, in terms of the physical characteristics of the gas, by avoiding difficult and lengthly calculation. The use of a cylindrical wall 18 with a discharge electrode in the form of a wire 24 at its centre achieves this end. In use a high potential is applied to the wire 24 in relation to the cylindrical wall 18 to produce an electrical field which causes ionisation of the gas and corona current flow which may be measured in a known manner with suitable instruments. The temperature of the gas being tested may be maintained accurately at any desired level by means of the electric heating element 32 and the thermocouple 33.

The apparatus shown may be modified if desired when making gas measurements, to avoid fringe and linkage effects, by inserting within the cylindrical wall 18 a cylindrical liner of electrically insulating material, which has deposited on its inner face three separate annular bands of electrically conductive material, the two outer of which are connected directly to earth and constitute guard rings to deal with fringe and leakage currents, while the central band, which is arranged around the central portion of the wire 24, is connected to earth through appropriate measuring instruments such as ammeters, microammeters, electrometers, cathode-ray oscilloscopes, spark rate counters or a combination of such instruments.

To carry out resistivity measurements on dispersoids in a flue gas, gas from the flue is allowed to flow through the precipitating chamber; by the precipitating action of the electrical field solid particles in suspension are deposited on the surface of cylindrical wall 18. The degree of precipitation that can be obtained is better than 99%, which is most important if meaningful results are to be obtained. It is essential to collect as far as possible all suspended particles from the gas as if some section of the population of particles is omitted it can have a serious effect on the validity of the final measurement.

When an adequate quantity of particles has been collected to fill the annular particle receiving zone between the annular electrode 41 and the central electrode 45 in the measuring chamber 16 (this is readily determined by experience and can be checked by measurement as explained below) the apparatus is rapped to cause the direct and immediate transfer of particles to the particle receiving zone. The term "rapped" is well known in the art and includes tapping or striking the apparatus or otherwise acting on it to shake loose the particles collected. These are subsequently compacted by vibrating the apparatus for a predetermined period to obtain a standardised degree of compaction of the particles.

The electrical heating elements 48 and 51 and thermocouples 52 and 53 are used to maintain the measuring chamber at an exactly predetermined temperature. This is also most important in obtaining meaningful and repeatable results as the resistitvity of the particles varies substantially with temperature. The ability of the apparatus to make measurements at a range of different temperatures can provide valuable information which may be used as a guide in the operation of the plant in connection with which measurements are being made.

The resistivity of the sample collected is measured by applying a known voltage across it and measuring the current. It is unnecessary to discuss the techniques of measurement and these are well understood. It suffices to say that by the use of direct or alternating current and suitable measuring instruments and bridges a variety of parameters of the collected particles such as resistivity, permittivity, loss angle, breakdown strength and polarisation may be measured. Such measurements may be readily used to provide an indication that the particle receiving zone between the measuring electrodes 41 and 45 is in fact full.

The apparatus described above as embodying the invention while preferred is but one form in which apparatus according to the invention may be constructed and those skilled in the art will be capable of readily devising alternative forms of construction.

It should be noted however that a satisfactory apparatus such as that described must provide the following features.

(1) Effective precipitation of as nearly all particles in the gas stream sample as possible.
(2) Direct transfer of collected particles to a measuring chamber.
(3) Maintenance of the collected particles at all times in the flue gas environment.
(4) Effective and accurate control of temperature throughout the apparatus.

Other features such as lightness, portability, robustness and general ease of use are also most desirable.

We claim:

1. An apparatus for measuring the properties of gases and solid particles, the apparatus consisting of an enclosure having within it a precipitating chamber, there being a gas inlet to the precipitating chamber and a gas outlet from the precipitating chamber, electrostatic precipitator means within the precipitating chamber including a surface on which particles of matter suspended in a gas in the precipitating chamber can be precipitated, a measuring chamber arranged so that particles collected on said surface may be transferred directly from the said surface to the measuring chamber by rapping the apparatus, measuring electrodes in the measuring chamber defining between them a particle receiving zone, electrical heating means being provided in association with said enclosure for heating said enclosure, thermo-sensitive means associated with said electrical heating means whereby the interior of said enclosure may be maintained at a predetermined temperature and means whereby electrical connection may be made to said electrostatic precipitator means, to said electrodes and to said electrical heating and thermo-sensitive means.

2. An apparatus as claimed in claim 1 wherein the precipitating chamber is bounded by a cylindrical wall which constitutes the collector electrode of the electrostatic precipitator means and the interior surface of which constitutes the said surface, the electrostatic precipitator means also including a discharge electrode in the form of a circular wire lying on the polar axis of the cylindrical wall.

3. An apparatus as claimed in claim 2 wherein the measuring chamber is cylindrical in form and is disposed immediately below the precipitating chamber in the normal position of use of the apparatus and as an axial continuation thereof, and wherein the measuring electrodes consist of an outer annular electrode within which and concentric with which lies a inner electrode of circular section, the particle receiving zone defined between the measuring electrodes being annular.

4. An apparatus as claimed in claim 3 wherein the said electric heating means consists in a first electric heater arranged around the said cylindrical wall, a second electric heater arranged around the said outer annular electrode and a third electric heater arranged within the said inner electrode.

5. An apparatus as claimed in claim 1 wherein the enclosure is made in two parts to permit the precipitating chamber to be separated from the measuring chamber and reconnected thereto at will.

6. An apparatus as claimed in claim 1 wherein the enclosure is surrounded by a layer of thermal insulating material.

References Cited
UNITED STATES PATENTS

| | | | |
|---|---|---|---|
| 2,100,155 | 11/1937 | Beran | 55—154 X |
| 2,252,222 | 8/1941 | Van Os | 324—65 X |
| 2,542,054 | 2/1951 | Penny et al. | 55—122 X |
| 2,712,362 | 7/1955 | Winklepleck | 55—112 X |
| 3,274,753 | 9/1966 | Brandt | 55—112 X |
| 3,369,346 | 2/1968 | Wildbolz et al. | 55—270 X |

EDWARD E. KUBASIEWICZ, Primary Examiner

U.S. Cl. X.R.

55—112, 154, 220, 466; 73—28